(12) United States Patent
Pandit et al.

(10) Patent No.: US 10,631,129 B1
(45) Date of Patent: Apr. 21, 2020

(54) FIRST RESPONDER FEEDBACK-BASED EMERGENCY RESPONSE FLOOR IDENTIFICATION

(71) Applicant: International Business Machines Corporation, Armonk, NY (US)

(72) Inventors: Sushain Pandit, Austin, TX (US); Charles D. Wolfson, Austin, TX (US); Brent Gross, Calgary (CA); Otis Smart, Duluth, GA (US); Harikumar Venkatesan, Santa Clara, CA (US); David A. Selby, Nr Fareham (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/148,967

(22) Filed: Oct. 1, 2018

(51) Int. Cl.
*H04W 4/33* (2018.01)
*H04W 4/024* (2018.01)
(Continued)

(52) U.S. Cl.
CPC ............ *H04W 4/024* (2018.02); *G06N 20/00* (2019.01); *G06Q 50/265* (2013.01); *G08B 27/001* (2013.01); *H04W 4/33* (2018.02)

(58) Field of Classification Search
CPC ....... H04W 4/024; H04W 4/029; H04W 4/90; H04W 4/33; G06N 20/00; G06Q 50/265; G08B 27/001
See application file for complete search history.

(56) References Cited

U.S. PATENT DOCUMENTS 7,126,951 B2 * 10/2006 Belcea .................. G01S 5/0252
370/400
7,203,497 B2 4/2007 Belcea
(Continued)

FOREIGN PATENT DOCUMENTS

GB 2541649 A 3/2017
GB 2542267 A 3/2017

OTHER PUBLICATIONS

IBM, List of IBM Patents or Patent Applications Treated as Related, Applicant Appendix, Oct. 1, 2018, pp. 1-2, the contents of which are incorporated herein by reference in their entirety.
(Continued)

*Primary Examiner* — Marcus Hammonds
(74) *Attorney, Agent, or Firm* — William H. Hartwell

(57) ABSTRACT

Known geospatial device coordinates are clustered using a machine learning-based clustering algorithm into device clusters with cluster centroids. Each device cluster corresponds to a geographical location. Each cluster centroid is annotated with a regional floor-height value of the respective geographical location. Current device data of a device, including latitude, longitude, and elevation, are received, and a geographic location of the device is determined using the latitude and longitude. An approximate current floor upon which the first device is located is determined by mapping the current device data of the first device to a closest cluster centroid, and calculating the approximate current floor using the elevation of the first device and the annotated regional floor-height value of the closest cluster centroid. An individual is directed to the device's geographic location and approximate current floor. The device clusters are re-computed based upon feedback from the individual regarding the device's actual floor.

20 Claims, 6 Drawing Sheets

(51) Int. Cl.
*G06Q 50/26* (2012.01)
*G08B 27/00* (2006.01)
*G06N 20/00* (2019.01)

(56) References Cited

U.S. PATENT DOCUMENTS

| | | | |
|---|---|---|---|
| 7,233,781 | B2 | 6/2007 | Hunter et al. |
| 7,525,426 | B2 | 4/2009 | Edelstein et al. |
| 7,885,902 | B1 | 2/2011 | Shoemaker et al. |
| 8,032,480 | B2 | 10/2011 | Pinckney et al. |
| 8,990,043 | B1 * | 3/2015 | Kolodziej ............... G01C 5/06 |
| | | | 702/150 |
| 9,053,624 | B2 * | 6/2015 | Bentley ............... G08B 13/2462 |
| 9,116,230 | B2 | 8/2015 | Vartanian et al. |
| 9,167,389 | B1 | 10/2015 | Murchison et al. |
| 9,439,165 | B2 * | 9/2016 | Azami ................. G01S 5/0252 |
| 9,838,850 | B2 * | 12/2017 | Huberman ............ H04W 4/029 |
| 9,936,342 | B2 * | 4/2018 | Huang .................... H04W 4/40 |
| 10,393,854 | B1 * | 8/2019 | Wolfson ................ H04W 4/029 |
| 10,408,914 | B1 * | 9/2019 | Wolfson ................. G08B 25/08 |
| 2006/0194588 | A1 * | 8/2006 | Zhao ..................... H04B 1/3805 |
| | | | 455/456.1 |
| 2013/0141233 | A1 | 6/2013 | Jacobs et al. |
| 2014/0039840 | A1 | 2/2014 | Yuen et al. |
| 2016/0140440 | A1 | 5/2016 | Hsueh et al. |
| 2017/0111000 | A1 | 4/2017 | Saito et al. |

OTHER PUBLICATIONS

Alex Varshavsky, et al., The SkyLoc Floor Localization System, In Proceedings of the Fifth Annual IEEE International Conference on Pervasive Computing and Communications (PerCom'07), Mar. 2007, pp. 1-10, IEEE Computing Society, White Plains, NY, USA.

Firas Alsehly, et al., Indoor positioning with floor determination in Multi Story Buildings, In Proceedings of the 2011 International Conference on Indoor Positioning and Indoor Navigation, Sep. 2011, pp. 1-7, IEEE Computing Society, Guimaraes, Portugal.

Andrew N. Seybold, Public Safety Advocate: Location Services, When?, Jul. 13, 2017, pp. 1-4, Andrew Seybold, Inc., Published at: http://allthingsfirstnet.com/public-safety-advocate-location-services-when/.

Rafal Gorak, et al., Indoor Localisation Based on GSM Signals: Multistorey Building Study, Mobile Information Systems, Jan. 2016, pp. 1-17, vol. 2016, Hindawi Publishing Corporation, Published at: http://dx.doi.org/10.1155/2016/2719576.

Mell et al., "The NIST Definition of Cloud Computing", Recommendations of the National Institute of Standards and Technology, Special Publication 800-145, Sep. 2011, 7 pages.

Wolfson et al., "Spatial Device Clustering-Based Emergency Response Floor Identification", U.S. Appl. No. 16/148,952, filed Oct. 1, 2018, 40 pages.

* cited by examiner

US 10,631,129 B1

FIRST RESPONDER FEEDBACK-BASED EMERGENCY RESPONSE FLOOR IDENTIFICATION

BACKGROUND

The present invention relates to technology for finding people that are in need of rescue in buildings during emergency response situations. More particularly, the present invention relates to first responder feedback-based emergency response floor identification.

Emergency response personnel respond to emergencies, and attempt to locate and rescue people that are in danger. The emergencies may include hurricanes, earthquakes, tornadoes, and other events that result in fires or other difficult rescue situations.

SUMMARY

A computer-implemented method includes clustering known geospatial device coordinates using a machine learning-based clustering algorithm, resulting in device clusters with corresponding cluster centroids, each device cluster corresponding to a particular geographical location; annotating each cluster centroid with a regional floor-height value of the respective particular geographical location; receiving current device data comprising latitude, longitude, and elevation of a first device; determining a geographic location of the first device using the received latitude and longitude of the first device; and determining an approximate current floor upon which the first device is located by: mapping the current device data of the first device to a closest cluster centroid associated with the geographic location of the first device; and the computer-implemented method further comprising: calculating the approximate current floor upon which the first device is located using the received elevation of the first device and the annotated regional floor-height value of the closest cluster centroid; and directing an individual to the geographic location and the approximate current floor of the first device; re-computing the device clusters based upon feedback received from the individual regarding an actual current floor of the first device; and determining a current floor for a second device based upon the re-computed device clusters.

A system that performs the computer-implemented method and a computer program product that causes a computer to perform the computer-implemented method are also described.

DETAILED DESCRIPTION

Figure 1:
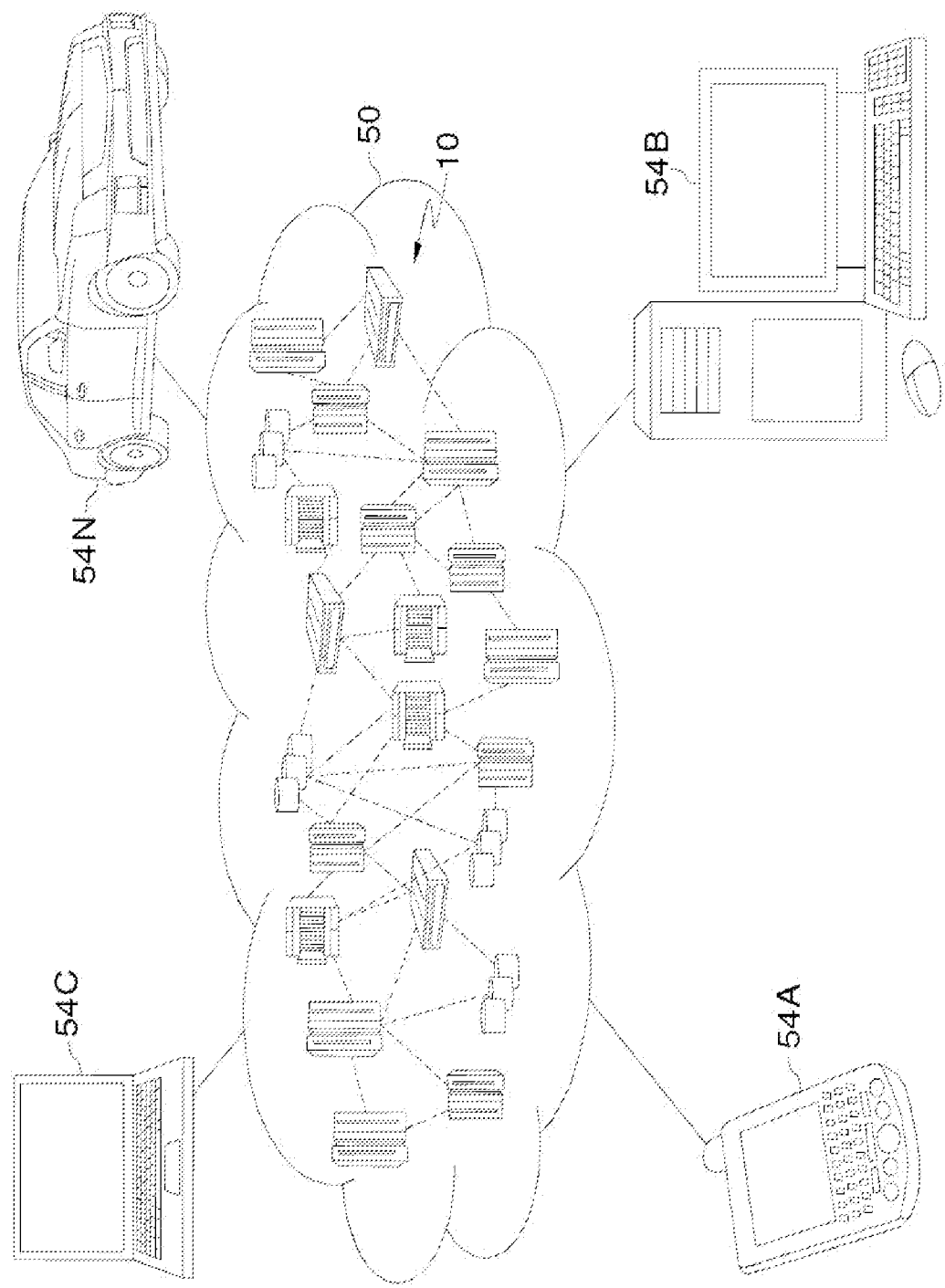
FIG. 1 depicts a cloud computing environment according to an embodiment of the present invention.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides first responder feedback-based emergency response floor identification. The present technology solves a recognized real-time floor identification problem during emergency response situations by providing a new form of a real-time feedback-based computing system and computer-based feedback processing that improve locating persons that are in need of rescue on different floors in buildings, such as within tall/high-rise structures and other multi-story buildings. By accurately identifying which different floors of a building upon which persons that are in need of rescue are located by use of emergency responder feedback, the present technology can assist with saving lives of the persons that are in danger within buildings. Additionally, because the time required to identify and rescue the persons that are in danger is reduced by the technology described herein, the time that emergency response personnel are inside buildings during emergencies can be reduced, and as a result the technology described herein can assist with saving lives of emergency response personnel. As such, the technology described herein improves both emergency response safety and success at saving lives of all persons at emergency locations during emergency response situations.

The improvements described herein are based on first responder feedback after the emergency response activity is completed. The system utilizes a device clustering algorithm that identifies device clusters within structures over time, and also synthesizes the first responder feedback to continually refine inter-floor height clusters in order to accurately determine regional, local, and building-specific median inter-floor height(s). The determined/updated inter-floor heights are then subsequently used in a real-time feedback loop to improve the floor calculation processing during subsequent/new emergency response situations.

To further detail the first responder feedback, where the device clustering algorithm specifies a particular floor upon which a person in need of assistance is located during an emergency situation, and the first responder actually locates the person in need of assistance on a different floor, this first responder feedback is utilized to adjust the algorithmic clustering and processing performed and the output of the device clustering algorithm. For example, where negative feedback is received from a first responder with respect to floor identification of a person in need of assistance during an emergency situation, the device clusters may be re-computed to refine the device clustering algorithm and processing in real time and over time. In this manner, the technology described herein operates autonomously on a computing platform to continually (and programmatically) self improve the programmatic processing performed by the computing platform and to improve identification of floors upon which persons are located during emergency situations. The first responder feedback thereby operates as real-time feedback that is utilized for real-time programmatic feedback-based processing adjustment by the computing platform itself.

With respect to determining the respective regional, local, and building-specific inter-floor height(s), it should be noted that different regions of a state and different areas of a city may have different types of structures. These different structures may be subject to different building codes by region and over time as new buildings are constructed. For example, a central city district may have very tall and older buildings that were constructed using older building codes that resulted in inter-floor heights of ten (10), twelve (12), or more feet. In contrast, newer areas of a city may also have very tall and newer buildings that were constructed using newer building codes that resulted in inter-floor heights smaller than ten (10) feet. Additionally, irrespective of the particular time or region in which a building was constructed, different floors of any building may have different inter-floor heights. For example, for a conference center, hotel, or other type of structure that serves multiple different uses, or a lobby or conference room on any given floor may have a very high ceiling heights (e.g., fifteen (15) or more feet high), while upper floors such as hotel rooms or offices may have normal inter-floor heights for the respective region or building codes that applied to the building at the time of construction. Further, as buildings are renovated over time, inter-floor heights can and often do change.

In view of the details above, it should be understood that these variations in buildings over time results in an emergency floor determination problem that requires programmatic processing to solve. The programmatic processing described herein operates to programmatically map buildings and inter-floor heights across regions and even as buildings change over time using device clustering in combination with real-time first responder feedback. In view of the programmatic nature of the processing described herein, much more accurate inter-floor mappings may be derived and refined over time by use of the technology described herein.

Regarding certain terminology used herein, for purposes of the present subject matter a point of interest (POI) is considered to be a multi-story building, a sky scraper or other tall/high-rise structure, a tower, and any other multi-story structure of any type that is partitioned into different floors to which the technology described herein may be applied. As such, while the term and acronym point of interest (POI) are utilized for ease of reference herein, it is understood that this term and acronym represent different types of building structures. Further, a "device" for purposes of the present description may be considered any portable device, such as a mobile phone, laptop, watch, or other device that is capable of measuring and providing at least longitude, latitude, and elevation of the respective device instantaneously in real time. Longitude and latitude may be determined and provided by a device using global positioning system (GPS) technology, while elevation may be determined and provided by a device using barometric pressure, or other appropriate technologies as appropriate for a given implementation. It is understood that use of barometric pressure yields an approximation of elevation that can be mapped by the technology described herein to particular floors of a particular POI. This mapping to particular floors of a POI can be refined as described herein by use of emergency response personnel feedback to improve floor determination(s) during emergency response situations. By combining use of these types of technologies, both over time and instantaneously in real time, accurate floor locations of persons during emergency situations may be determined, as described herein.

The technology described herein operates by performing historical floor mapping of devices for different POIs over time, and by integrating emergency response personnel feedback with respect to the accuracy of provided floor mappings to continually improve and refine the floor mappings that are provided. Initial inter-floor mappings can be identified by use of a database of known latitude, longitude, and zip code (or area code) to define initial clusters for a region, and can utilize publicly-known or approximate regional inter-floor height values to assign a median inter-floor height annotation to each device cluster. This form of device clustering may be considered linear device clustering that may be adapted over time to actual building mappings by augmenting the initial inter-floor mappings by use of the first responder feedback, as described herein.

For purposes of the present description, historical device clusters may be derived over time as described further below. The description of the historical device clustering is deferred initially to focus initially on the real-time programmatic processing performed during and after an emergency response situation.

To further detail the technical processing described herein as applied during and after an emergency response situation, certain information may be derived directly from information associated with the caller's mobile device. Specifically, the address of the emergency may be derived from latitude and longitude associated with the mobile device, while altitude may be derived from a barometric pressure computation performed by the mobile device.

The identified address and elevation are then mapped into a historical device cluster associated with the structure within which the emergency call originated and where the mobile device is located to determine a median inter-floor height (Eh) for the structure. This determined median inter-floor height is then used to assert to the first responder a floor level upon which the caller is located within the building.

The following Equation (1) may be used to assert a floor to the first responder:

$$\text{Floor} = \text{round}((\text{altitude} - (Gh + Ah))/Eh)$$

where,
Gh=Ground height from Shuttle Radar Topography Mission (SRTM) Service
Eh=Floor height (estimated median floor height)
Ah=Average human waist height
Equation (1): Floor Calculation Using the resulting floor determination from Equation (1) described above, a first responder that is located close to the location of the emergency may be directly located based upon proximity of a mobile device of the first responder. An alert is then sent to the identified first responder, taking into account the latitude and longitude and the computed elevation, to notify a first responder of the determined floor level upon which the caller is located.

Upon completion of the emergency response situation (e.g., caller is rescued), the system prompts the first responder for feedback via the mobile application (app)

seeking input from the first responder regarding: (1) how accurate the floor notification was, and (2) whether the alerts provided were timely. The feedback requested and provided may be in any form suitable for a particular implementation. For example, the feedback may be in the form of a rating, where a "low" rating triggers a subsequent prompt asking the first responder to input the actual floor upon which the caller was located, and the system stores the input value for use during re-clustering, as described in more detail below. In contrast, a "high" rating may be utilized to increase a confidence measure with respect to the current cluster mapping.

The system analyzes and accumulates the feedback received from first responders over time. Once a received number of "low" ratings exceed a pre-defined threshold, the system performs re-clustering using the feedback received from the first responder(s) for all locations for which a low rating was received. For all the other data points in the regional database, clustering is performed without adjustment from feedback. The net outcome of this processing is that the clusters are forced to evolve over time into how the location-specific floor heights are actually segmented. It should be noted that this cluster evolution may result in non-linear post-feedback clustering, under which clusters representing centrally-located downtown areas versus bordering suburbs, for example, may differ (e.g., from region to region, and building to building). Once the re-clustering is completed, the processing described above is repeated for subsequent emergency situations/callers utilizing the revised clusters to determine a more accurate median inter-floor height (Eh).

As such, the processing described herein begins with an initial set of information regarding device clusters and floor mappings, and operates over time to refine the floor mappings using first responder feedback. Accordingly, more accurate and improved emergency responses that result in increased safety for both persons in need of emergency assistance and emergency responders can result over time by use of the technology described herein.

Further regarding the device clustering aspects of the technology described herein, the following description provides a foundation for device cluster processing. Floor mapping for a specific POI is based upon clustering of historical device data (e.g., latitude, longitude, elevation) captured and/or calculated over a period of time for multiple devices. The time period may be any time period appropriate for a given implementation, such as one month, multiple months, and one or more years.

The historical device latitude and longitude define a bounding box that is mapped to the structural boundaries of the particular POI under evaluation. Queried device data (latitude, longitude, elevation) within this bounding box for the selected historical time window establish historical device location and travel pathways within particular floors of the POI.

From this selection of data points, outlying data points ("outliers") are removed. Removal of outliers may be performed by use of one or more outlier detection and filtration techniques. Removal of outlying data points improves clustering results, and the particular outlier detection and filtering techniques that are utilized may be selected as appropriate for a given implementation. The remnant data after removal of the outlying data points becomes the input of the clustering algorithm(s).

Clustering for each POI is performed using one or more machine learning-based algorithms. The machine learning-based algorithms that are utilized include vector quantization-based k-means clustering (hereinafter "k-means"), density-based spatial clustering of applications with noise (hereinafter "DBSCAN"), or a combination of such algorithms. The input of the algorithm is the historical device data for the specific POI. The output of the algorithm includes cluster centroids, where each centroid represents an estimated floor upon which the devices are historically located within the POI. The cluster centroids are output as both a spatial point and an index (e.g., a floor number), along with a corresponding cluster score that quantifies accuracy of the respective computed clusters.

To further describe computer-based implementation of these machine learning-based algorithms to the first responder feedback-based emergency response floor identification described herein, K-means is a spatial clustering algorithm that, when given input data of the form described herein, yields a squared Euclidean distance measure that enables grouping of observed elevation values as "k" clusters, with each input value assigned to the cluster of the nearest mean (centroid). As described above, this cluster centroid is mapped historically to an indexed floor number.

DBSCAN is a spatial clustering algorithm that is somewhat noise tolerant and, when given input data of the form described herein, yields a distance measure that is chosen in a way that it gives precedence to tuples that evaluate within a very narrow epsilon neighborhood. Use of DBSCAN may be implemented to relax latitude and longitude because floor dimensions are invariably larger than floor height for a given POI.

As a result of application of these types of machine learning-based algorithms to the problem of first responder feedback-based emergency response floor identification described herein, several properties of a POI may be programmatically derived. Specifically, dense clusters would be formed for points on floors. Very dense clusters would be formed in frequently visited places (e.g., a lobby, a conference halls, etc.). Ultra-dense clusters would be formed on floors that form a part of a building that is wider than the rest (e.g., lower floors of a high-rise are typically wider than the upper floors). Sparse clusters (outliers) would be formed elsewhere, and may be removed from the historical clustering or utilized, as appropriate for a given implementation.

With the historical clustering performed over any available time period prior to an emergency response situation, caller pinpointing to locate a caller in need of emergency assistance may be performed to determine in real-time the current floor upon which the caller is located. This real-time determination of the current floor upon which the caller is located may be performed by using the caller's device data (e.g., the caller's device latitude, longitude, and altitude) and mapping the caller's device data to the closest historical cluster centroid via a distance metric that allows selection among different clusters according to the particular historical clusters of the particular POI. Emergency response personnel may then be queried regarding accuracy of the provided floor mapping, and the historical clustering may be refined using the emergency response personnel feedback to improve accuracy of the floor mappings provided to emergency response personnel over time.

It should be understood that no clusters would be historically identified between floors of a particular POI for purposes of establishing clusters to which to map real-time callers during emergency situations. With this understanding, stairwells and elevator locations would be known to emergency response personnel, so any real-time caller device data that is located between centroids that represent floors may be leveraged to determine that the caller is in a stairwell or elevator.

The technology described herein operates by clustering known geospatial device coordinates using a machine learning-based clustering algorithm, resulting in device clusters with corresponding cluster centroids, each device cluster corresponding to a particular geographical location. Each cluster centroid is annotated with a regional floor-height value of the respective particular geographical location. Current device data of a first device is received that includes latitude, longitude, and elevation. A geographic location of the first device is determined using the received latitude and longitude of the first device. An approximate current floor upon which the first device is located is determined by: (i) mapping the current device data of the first device to a closest cluster centroid associated with the geographic location of the first device, and (ii) calculating the approximate current floor upon which the first device is located using the received elevation of the first device and the annotated regional floor-height value of the closest cluster centroid. An individual is directed to the geographic location and approximate current floor of the first device. the device clusters are re-computed based upon feedback received from the individual regarding an actual current floor of the first device. A current floor for a second device is determined based upon the re-computed device clusters.

It should be noted that conception of the present subject matter resulted from recognition of certain limitations associated with emergency response situations. For example, it was observed that emergency response systems (also termed "9-1-1" systems) have fallen behind in terms of accurately locating callers because the underlying location determination technology that is used relies primarily on system infrastructure that was built prior to the year 1996, which is before most mobile devices provided environmental sensing capabilities. In 2015, the Federal Communications Commission (FCC) published several rules for horizontal (x, y) and vertical (z) location requirements for locating callers when calls come into Public Safety Answering Points (PSAPs). However, it was determined that several outstanding issues still remain when it comes to computing an address to a dispatch location, particularly for callers that are trapped inside premises (e.g., buildings, malls, etc.). It was determined that technology that augments location determination with information from multiple sensors that are present on a caller's device in combination with each of historical device clustering information across multiple different floors of a building and first responder feedback from prior emergency events would improve real-time multi-floor device location-identification technology. The technology described herein provides a new method for improving floor calculations to further enhance location determination for address dispatch and emergency response personnel. This improvement is based on use of first responder feedback to determine accurate floor mapping for certain points of interest (POIs) during real-time emergency response situations. The present subject matter improves emergency response accuracy by providing for first responder feedback-based emergency response floor identification, as described above and in more detail below. As such, improved real-time emergency response safety and success may be obtained through use of the present technology.

The first responder feedback-based emergency response floor identification described herein may be performed in real time to allow prompt identification of locations of persons that are in need of rescue on different floors of buildings. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Additional details of the algorithmic processing and computational efficiencies will be provided further below. The following portion of the present description provides examples of advanced computational platform(s) within which the present technology may be implemented, followed by further details of the first responder feedback-based emergency response floor identification described herein.

It should be noted that the present technology may be implemented within or as part of a cloud computing environment (e.g., for data analytics), or may be implemented as a customized environment-specific solution. As such, examples of implementations for both environments are included herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
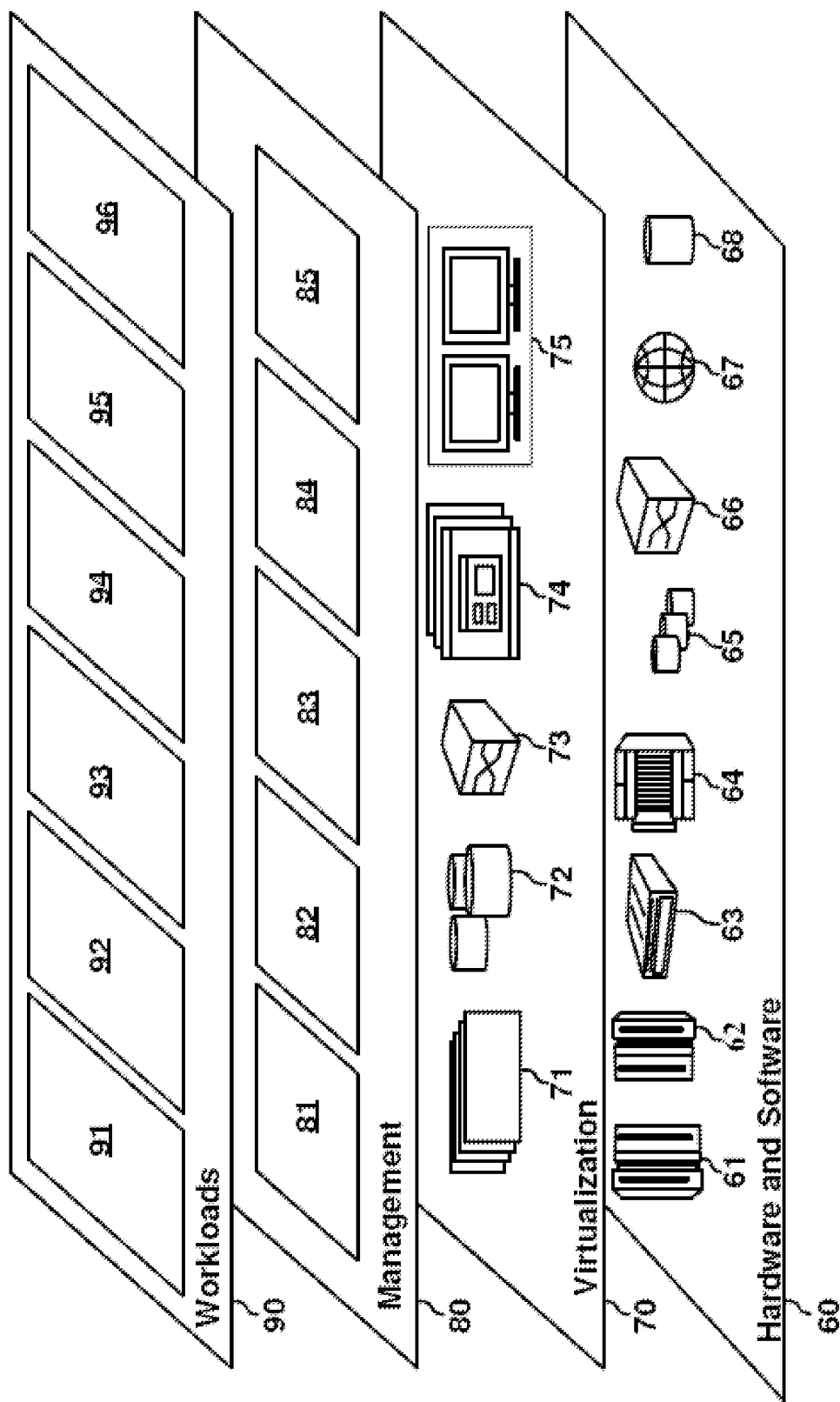
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and first responder feedback-based emergency response floor identification 96.

Figure 3:
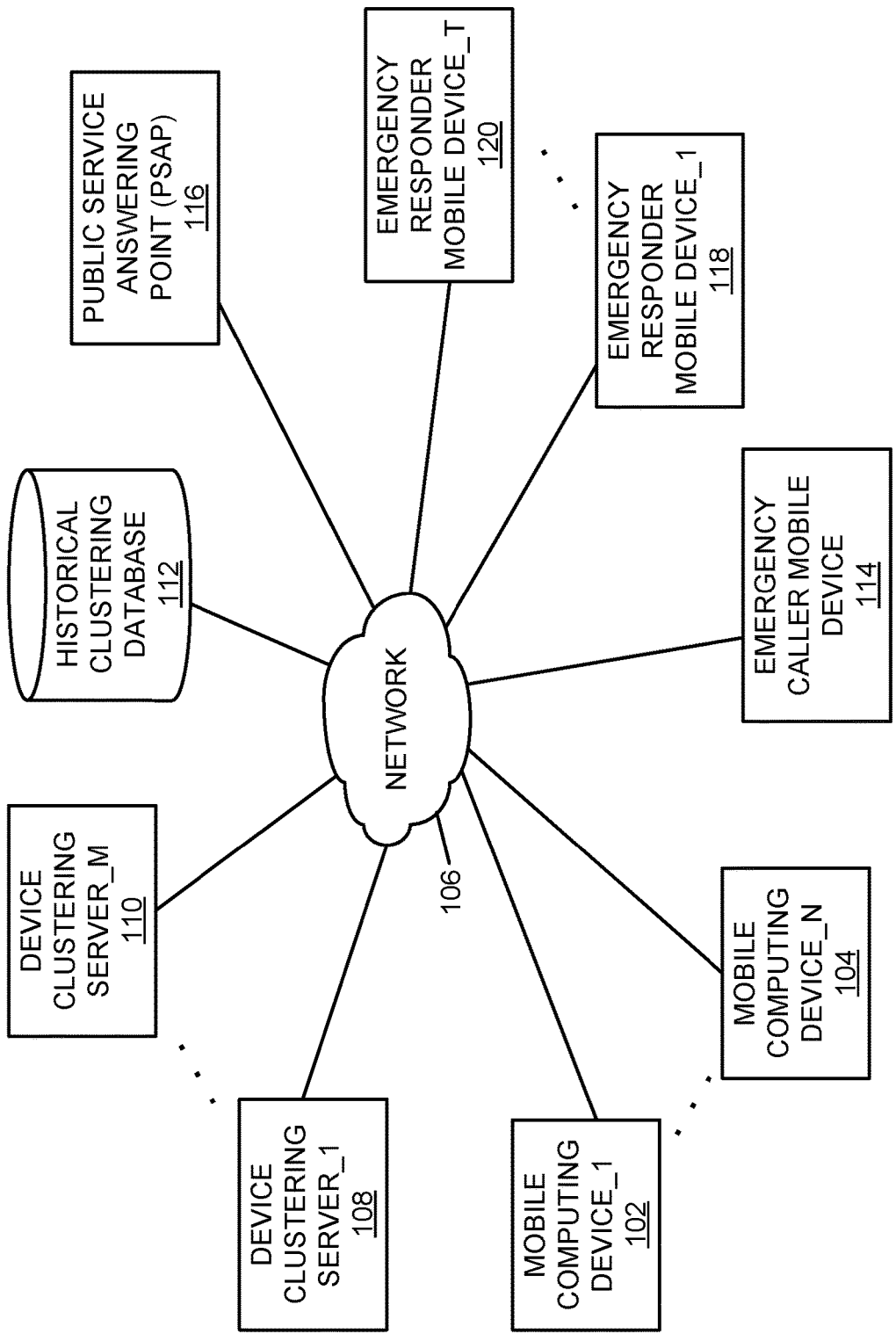
FIG. 3 is a block diagram of an example of an implementation of an alternative system for first responder feedback-based emergency response floor identification according to an embodiment of the present subject matter.

FIG. 3 is a block diagram of an example of an implementation of an alternative system 100 for first responder feedback-based emergency response floor identification. A mobile computing device_1 102 through a mobile computing device_N 104 represent user devices that may be used by persons in a building. The mobile computing device_1 102 through the mobile computing device_N 104 can be cellular telephones, laptop computers, or other mobile devices that a user can use and carry within a building/POI. As such, the mobile computing device_1 102 through the mobile computing device_N 104 can be used as locatable mobile devices to determine locations of persons that are carrying or are near the respective devices.

The mobile computing device_1 102 through the mobile computing device_N 104 can communicate with other devices using a network 106. The other devices include one or more general servers, such as email servers, website servers, and other types of servers. These general servers are not separately illustrated within FIG. 3 to avoid crowding within the drawing, but are understood to form a portion of the system 100.

A device clustering server_1 108 through a device clustering server_M 110 utilize location-based technologies, such as information derived from or provided by the mobile computing device_1 102 through the mobile computing device_N 104, to establish device clusters and device cluster centroids within one or more POIs. As described above, the information derived from or provided by the mobile computing device_1 102 through the mobile computing device_N 104 can include latitude, longitude, and elevation. As also described above, floor mapping for a specific POI is based upon clustering of historical device data, such as known geospatial device coordinates (e.g., latitude, longitude, elevation) captured and/or calculated over a period of time for multiple devices. The time period may be any time period appropriate for a given implementation, such as one month, multiple months, and one or more years.

A historical clustering database 112 stores device clustering information for POIs, as described above. The historical clustering database 112 can be utilized both to derive historical device data and to map real-time emergency response data into the historical device data set to allow specification of a particular floor upon which one or more emergency callers is/are located.

An emergency caller mobile device 114 represents one or more mobile devices similar to the mobile computing device_1 102 through the mobile computing device_N 104 that may be co-located with one or more emergency callers. The emergency caller mobile device 114 is illustrated separately within FIG. 3 to illustrate the following description of an emergency response situation.

Responsive to an emergency call from a user of the emergency caller mobile device 114, a public service answering point (PSAP) 116 is contacted. The PSAP 116 conveys the emergency to one or more emergency responders that carry one or more of emergency responder mobile device_1 118 through emergency responder mobile device_T 120. The emergency responders deploy to the specific POI at which the emergency situation is located.

Contemporaneously (in real-time) with the emergency call, location information associated with the emergency caller mobile device 114 is captured and utilized by one or more of the device clustering server_1 108 through the device clustering server_M 110 to identify the known geospatial device coordinates indicative of historical device clustering information stored within the historical clustering database 112 for the particular POI at which the emergency is located. The respective device clustering server(s) 108 through 110 map the device location data (again, latitude, longitude, and elevation) into the historical device data that documents historical device clusters and cluster centroids of the particular POI at which the emergency is located. A geographic location of the caller's device is determined using the latitude and longitude of the device, and from the determined geographic location a subset of the historical device clustering information may be utilized to determine an approximate floor upon which a first device is located. To determine the approximate floor upon which the first device is located, the respective device clustering server(s) 108 through 110 map the current device data of the caller's device to a closest cluster centroid associated with the geographic location of the first device, and calculate the approximate current floor upon which the first device is located using the elevation of the first device and an annotated regional floor-height value of the closest cluster centroid.

As a result of this advanced real-time processing, the particular floor upon which the caller is located can be conveyed to the emergency responder(s) via the respective one or more of the emergency responder mobile device(s) 118 through 120 while the emergency responders are still in route to the POI. As a result, the emergency responders may be advised of the particular floor of the POI upon which the emergency caller is believed to be located prior to even arriving to the emergency. Accordingly, the emergency response personnel may immediately deploy the necessary ladder(s) and other related emergency response equipment that is particularly suited to the specific emergency situation and floor of the POI. As described herein, the present technology receives feedback from the emergency response personnel regarding the actual current floor of the caller's device, and re-computes the historical device clusters based upon the feedback.

As such, the floor approximations are improved over time as a result of the emergency response personnel feedback. This real-time processing improves the technology of computer-based management of emergency response situations by providing technology and information that could not previously be derived or provided to emergency response personnel. As described above, the technology described herein can assist with saving lives of the persons that are in danger within buildings. Additionally, because the time required to identify and rescue the persons that are in danger is reduced by the technology described herein, the time that emergency response personnel are inside buildings during emergencies can be reduced, and as a result the technology described herein can assist with saving lives of emergency response personnel. As such, the technology described herein improves both emergency response safety and success at saving lives of all persons at emergency locations during emergency response situations.

While the system 100 of FIG. 3 has been described according to a particular set of interactions among devices, it should be understood that any of the mobile computing device_1 102 through the mobile computing device_N 104, and the device clustering server_1 108 through the device clustering server_M 110, may utilize the historical clustering database 112 (or other suitable platform) to each provide automated first responder feedback-based emergency response floor identification. The automated first responder feedback-based emergency response floor identification is based upon identification of historical device clusters in POIs in combination with first responder feedback to provide technology that more-accurately identifies real-time device floor locations within particular POIs during emergency response situations.

In view of the implementation alternatives described above, the present technology may be implemented within a cloud computing platform, at a user computing device, at a server device level, or by a combination of such platforms and devices as appropriate for a given implementation. A variety of possibilities exist for implementation of the present subject matter, and all such possibilities are considered within the scope of the present subject matter.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The device clustering server_1 108 through the device clustering server_M 110 may include any device capable of providing data for consumption by a device, such as the mobile computing device_1 102 through the mobile computing device_N 104 and the emergency responder mobile device_1 118 though the emergency responder mobile device_T 120, via a network, such as the network 106. As such, the device clustering server_1 108 through the device clustering server_M 110 may each include a web server, application server, or other data server device.

The historical clustering database 112 may include a relational database, an object database, or any other storage type of device. As such, the historical clustering database 112 may be implemented as appropriate for a given implementation.

Figure 4:
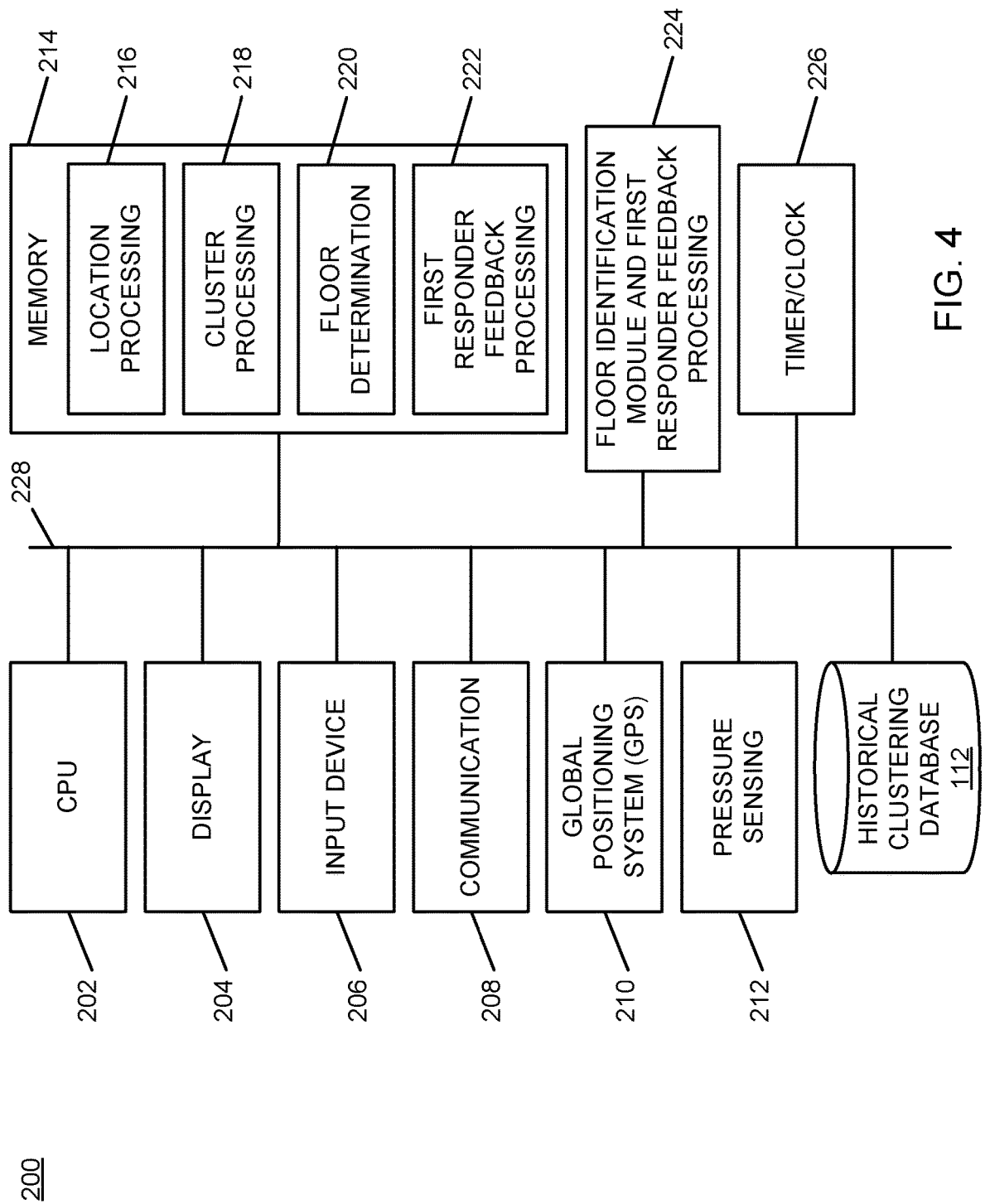
FIG. 4 is a block diagram of an example of an implementation of a core processing module capable of performing first responder feedback-based emergency response floor identification according to an embodiment of the present subject matter.

FIG. 4 is a block diagram of an example of an implementation of a core processing module 200 capable of performing first responder feedback-based emergency response floor identification. The core processing module 200 may be associated with either the mobile computing device_1 102 through the mobile computing device_N 104, with the device clustering server_1 108 through the device clustering server_M 110, with the PSAP 116, with the emergency responder mobile device_1 118 though the emergency responder mobile device_T 120, or with devices within the cloud computing environment 50, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of first responder feedback-based emergency response floor identification in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor" or "application-specific" processor) provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

A communication module 208 provides hardware, protocol stack processing, and interconnection capabilities that allow the core processing module 200 to communicate with other modules within the system 100, or within the cloud computing environment 50, as appropriate for a given implementation. The communication module 208 may include any electrical, protocol, and protocol conversion capabilities useable to provide interconnection capabilities, as appropriate for a given implementation. As such, the communication module 208 represents a communication device capable of carrying out communications with other devices. The communication module 208 may further include one or more wireless communication capabilities, as appropriate for the given implementation.

A global positioning system (GPS) module 210 provides positioning location coordinates usable for identifying latitude and longitude of mobile devices over time and in real time. The GPS module 210 may also be used to identify a physical and/or logical location of a mobile device.

A pressure sensing module 212 provides elevation measurements of mobile devices over time and in real time. The pressure sensing module 212 may use barometric pressure, or other appropriate technologies as appropriate for a given implementation, to determine an elevation of a mobile device.

A memory 214 includes a location processing storage area 216 that stores device location information (latitude, longitude, and elevation) during processing of either historical device location information for historical cluster identification or for real-time emergency device floor location processing in association with the core processing module 200. Location identification information generated by the GPS module 210 and elevation information generated by the pressure sensing module 212 may be stored within the location processing storage area 216.

A cluster processing storage area 218 provides computational and storage space for cluster identification and for cluster mapping during each of the historical cluster identification and real-time emergency response processing, respectively. A floor determination storage area 220 provides storage for device mappings of mobile devices (both historical and real-time) to different floors in one or more buildings. A first responder feedback processing module 222 provides storage for feedback processing to re-compute the device clusters stored within the cluster processing area 218 based upon the first responder feedback.

It is understood that the memory 214 may include any combination of volatile and non-volatile memory suitable for the intended purpose, distributed or localized as appropriate, and may include other memory segments not illustrated within the present example for ease of illustration purposes. For example, the memory 214 may include a code storage area, an operating system storage area, a code execution area, and a data area without departure from the scope of the present subject matter.

A floor identification module 224 is also illustrated. The floor identification module 224 provides both historical and real-time device location processing for/within the core processing module 200, as described above and in more detail below. The floor identification module 224 implements the automated first responder feedback-based emergency response floor identification of the core processing module 200.

It should also be noted that the floor identification module 224 may form a portion of other circuitry described without departure from the scope of the present subject matter. The floor identification module 224 may form a portion of an interrupt service routine (ISR), a portion of an operating system, or a portion of an application without departure from the scope of the present subject matter. The floor identification module 224 may also include an embedded device with circuitry designed specifically to perform the processing described herein as appropriate for a given implementation.

A timer/clock module 226 is illustrated and used to determine timing and date information, such as for historical and real-time mobile device location detection, as described above and in more detail below. As such, the floor identification module 224 may utilize information derived from the timer/clock module 226 for information processing activities, such as the first responder feedback-based emergency response floor identification described herein.

The historical clustering database 112 is again shown within FIG. 4 associated with the core processing module 200. As such, the historical clustering database 112 may be operatively coupled to the core processing module 200 without use of network connectivity, as appropriate for a given implementation.

The CPU 202, the display 204, the input device 206, the communication module 208, the GPS module 210, the pressure sensing module 212, the memory 214, the floor identification module 224, the timer/clock module 226, and the historical clustering database 112 are interconnected via an interconnection 228. The interconnection 228 may include a system bus, a network, or any other interconnection capable of providing the respective components with suitable interconnection for the respective purpose.

Though the different modules illustrated within FIG. 4 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. It should also be understood that, though the historical clustering database 112 is illustrated as a separate component for purposes of example, the information stored within the historical clustering database 112 may also/alternatively be stored within the memory 214 without departure from the scope of the present subject matter. Accordingly, the core processing module 200 may take many forms and may be associated with many platforms.

Figure 5:
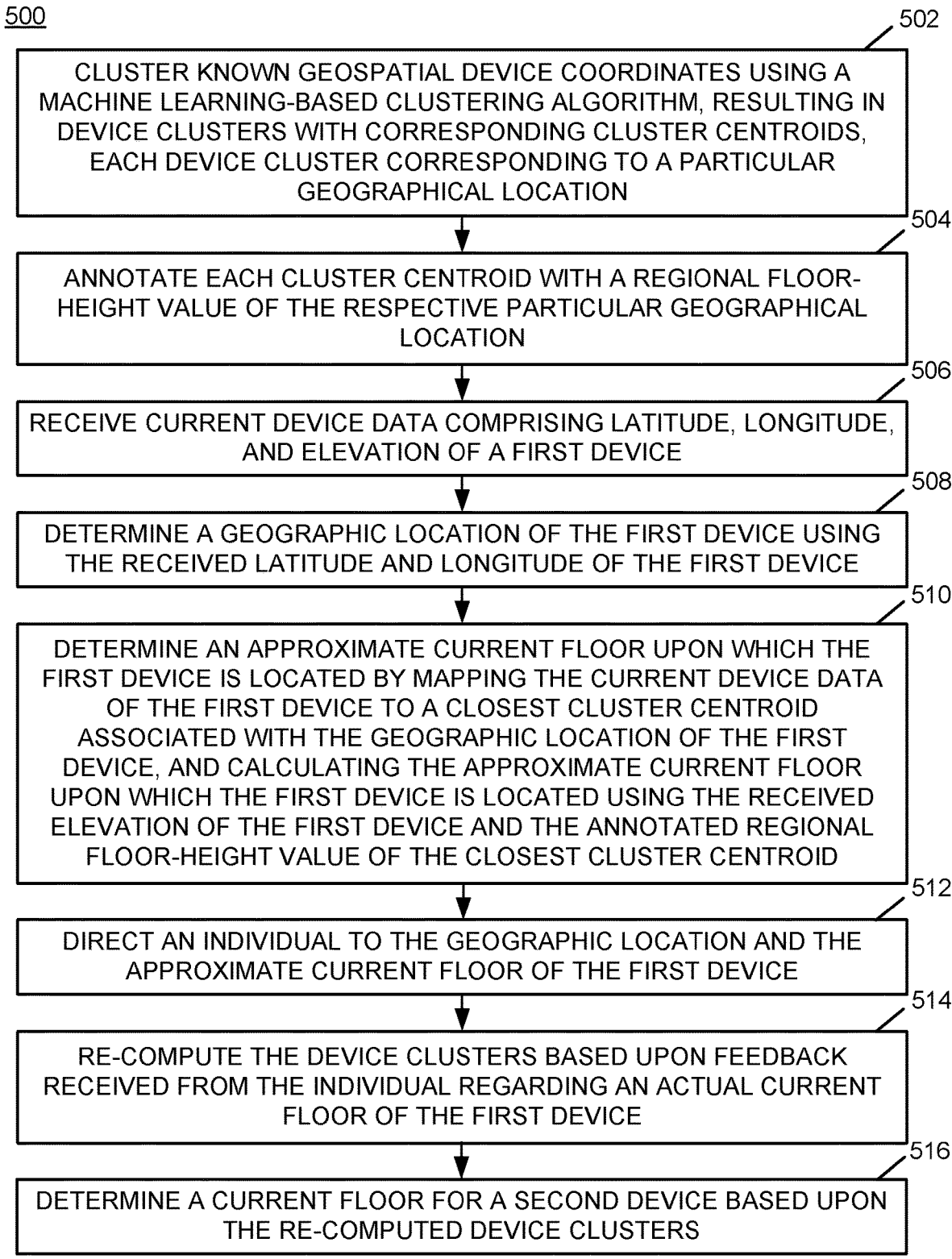
FIG. 5 is a flow chart of an example of an implementation of a process for first responder feedback-based emergency response floor identification according to an embodiment of the present subject matter.
Figure 6:
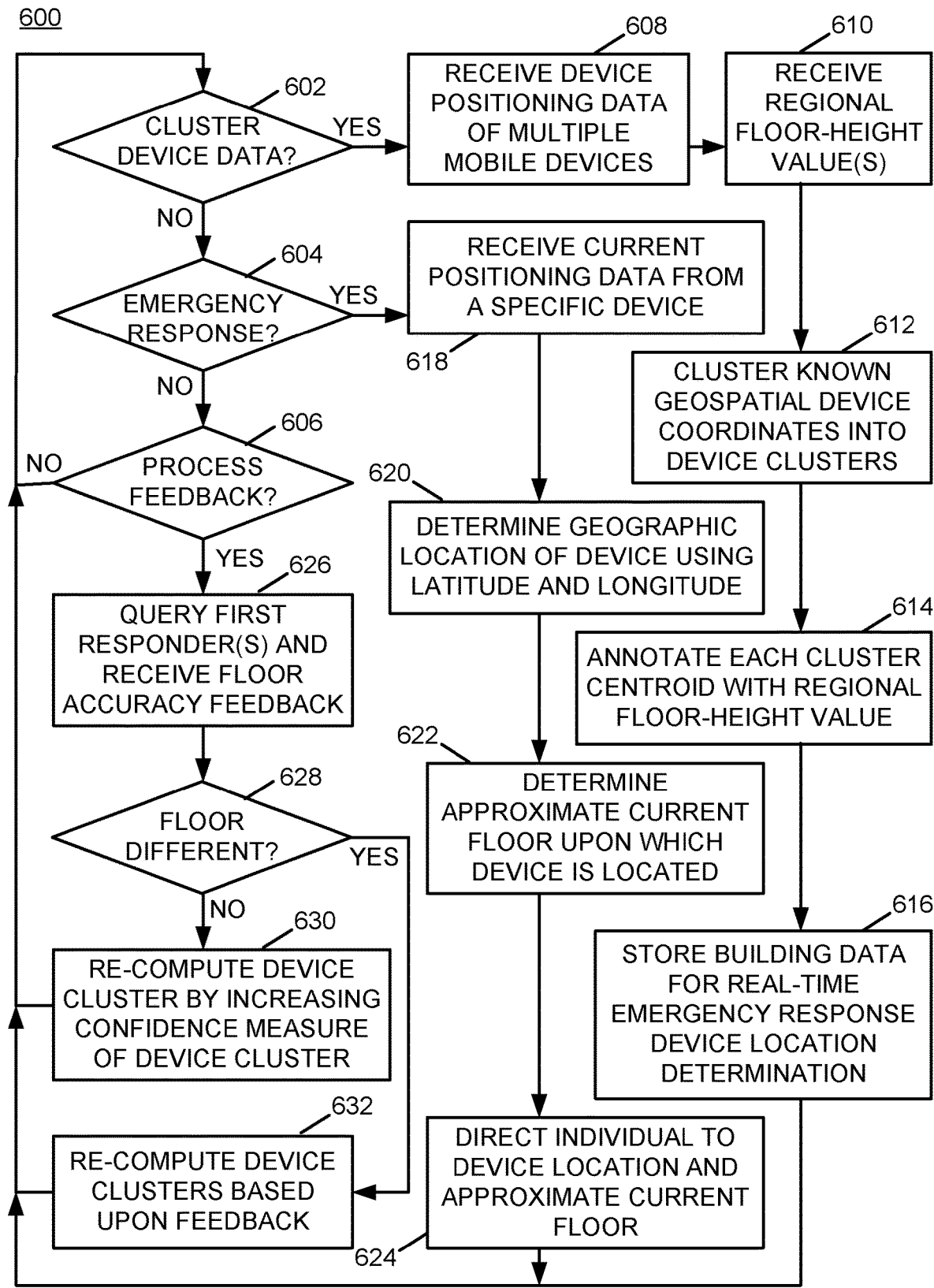
FIG. 6 is a flow chart of an example of an implementation of a process for first responder feedback-based emergency response floor identification that shows additional details related to first responder feedback in response to emergency situations to improve floor determination during emergency response situations according to an embodiment of the present subject matter.

FIG. 5 through FIG. 6 described below represent example processes that may be executed by devices, such as the core processing module 200, to perform the first responder feedback-based emergency response floor identification associated with the present subject matter. Many other variations on the example processes are possible and all are considered within the scope of the present subject matter. The example processes may be performed by modules, such as the floor identification module 224 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 5 is a flow chart of an example of an implementation of a process 500 for first responder feedback-based emergency response floor identification. The process 500 represents a computer-implemented method of performing the subject matter described herein. At block 502, the process 500 clusters known geospatial device coordinates using a machine learning-based clustering algorithm, resulting in device clusters with corresponding cluster centroids, each device cluster corresponding to a particular geographical location. At block 504, the process 500 annotates each cluster centroid with a regional floor-height value of the respective particular geographical location. At block 506, the process 500 receives current device data comprising latitude, longitude, and elevation of a first device. At block 508, the process 500 determines a geographic location of the first device using the received latitude and longitude of the first device. At block 510, the process 500 determines an approximate current floor upon which the first device is located by mapping the current device data of the first device to a closest cluster centroid associated with the geographic location of the first device; and calculating the approximate current floor upon which the first device is located using the received elevation of the first device and the annotated regional floor-height value of the closest cluster centroid. At block 512, the process 500 directs an individual to the geographic location and the approximate current floor of the first device. At block 514, the process 500 re-computes the device clusters based upon feedback received from the individual regarding an actual current floor of the first device. At block 516, the process 500 determines a current floor for a second device based upon the re-computed device clusters.

FIG. 6 is a flow chart of an example of an implementation of a process 600 for first responder feedback-based emergency response floor identification that shows additional details related to first responder feedback in response to emergency situations to improve floor determination during emergency response situations. The process 600 represents a computer-implemented method of performing the technical subject matter described herein. The process 600 is illustrated and described with respect to a single building structure for ease of description. However, it is understood that the process 600 is considered to incorporate processing to perform both device clustering analysis and real-time device location feedback processing for multiple building structures without departure from the scope of the present description. As such, any reference to processing associated with particular devices and with a particular building or a particular first responder within the description below is considered to be selectively applied to one of multiple devices, multiple buildings, and multiple first responders, as appropriate for the particular portion of the description and implementation. This additional selective processing is omitted only to reduce complexity within the drawing and description to focus on more technical details of the processing described. It should further be understood that the processing described below associated with device clustering analysis and first responder feedback may be performed over time and in real time as appropriate for a particular implementation, rather than post processing the device positioning data or the first responder feedback as a set.

At decision point 602, the process 600 begins iterative processing to perform clustering of device data for use during emergency response situations, real-time emergency response processing, and first responder feedback processing, as described below. It should be noted that real-time emergency response processing may be initiated in response to one or more emergency contacts (e.g., mobile phone calls, text messages, emails, etc.) that report an emergency situation to which emergency response personnel are requested to be deployed. The higher-level iterative processing is described below prior to describing details of the respective individual branches of processing.

As such, at decision point 602, the process 600 makes a determination as to whether to cluster device data for use during emergency response situations. In response to determining not to cluster device data for use during emergency response situations, the process 600 makes a determination at decision point 604 as to whether to initiate real-time emergency response processing. In response to determining not to perform real-time emergency response processing, the process 600 makes a determination at decision point 606 as to whether to process first responder feedback. It should be noted that processing of first responder feedback may occur at any time during or after an emergency response situation, as appropriate for a given implementation. In response to determining not to process first responder feedback, the process 600 returns to decision point 602 and iterates as described above. It should be understood that software programmed according to the processing described herein can be provided as a service in a cloud environment.

Returning to the description of decision point 602, in response to determining to cluster device data for use during emergency response situations, the process 600 receives device positioning data of multiple mobile devices at block 608. As described above, the device positioning data can include latitude, longitude, and elevation data. At block 610, the process 600 receives one or more regional floor-height value(s) associated with one or more regions associated with the received device positioning data.

At block 612, the process 600 clusters known geospatial device coordinates into resulting device clusters with corresponding cluster centroids. The known geospatial coordinates include latitude coordinates, longitude coordinates, and elevation coordinates of one or more devices. The known geospatial device coordinates may include historical device location data. The device clusters correspond to particular geographical locations (e.g., a building, or other location). As described above, the process 600 can use a machine learning-based clustering algorithm, such as vector quantization-based k-means clustering or density-based spatial clustering of applications with noise (DBSCAN), to cluster known geospatial device coordinates into device clusters.

At block 614, the process 600 annotates each cluster centroid with a regional floor-height value of the respective particular geographical locations and/or buildings. The regional floor-height value annotated to each cluster centroid may include a publicly known regional floor-height value, an approximate regional floor-height value of the respective particular geographical locations, or other regional floor-height value as appropriate for a given implementation. As will be described in more detail below, the annotated regional-floor height will be used to provide floor identifications during emergency situations to emergency first responders, and may be adjusted over time using feedback from the emergency responders. At block 616, the process 600 stores annotated device cluster data for use during a real-time emergency response and first responder feedback processing. The process 600 returns to decision point 602 and iterates as described above.

Returning to the description of decision point 604, the processing responsive to decision point 604 represents real-time processing during an emergency response situation. The processing described below may be performed concurrently for multiple devices in real time.

At decision point 604, in response to determining to initiate real-time emergency response processing, such as in response to an emergency 9-1-1 call or other communication, the process 600 receives current positioning data (e.g., latitude, longitude, and elevation) from a specific mobile device at block 618. At block 620, the process 600 determines a geographic location of the device using the latitude and longitude of the device. At block 622, the process 600 determines an approximate current floor upon which the device is located. The determination of the approximate current floor upon which the device is located may be performed by mapping the current device data of the device to a closest cluster centroid associated with the geographic location of the device, and calculating the approximate current floor upon which the first device is located using the received elevation of the first device and the annotated regional floor-height value of the closest cluster centroid.

At block 624, the process 600 directs an individual to the device's geographic location and approximate current floor. The individual may include one or more emergency first responders. As such, the process 600 utilizes the results of the machine learning-based clustering algorithm to further identify a location of the specific device and the approximate current floor of the building during an emergency response situation. The process 600 returns to decision point 602 at iterates as described above.

Returning to the description of decision point 606, the processing responsive to decision point 606 represents real-time processing of first responder feedback concurrently during an emergency response situation or after an emergency response situation. The processing described below may be performed concurrently for multiple first responders in real time.

In response to determining to process first responder feedback at decision point 606, the process 600 queries one or more first responders and receives floor accuracy feedback at block 626. The floor accuracy feedback may be queried and obtained by use of a mobile application (app) on mobile devices of first responders. The mobile application may provide questions to the first responders, such as "Was the floor accurate?" and "Were the alerts timely?" Other questions may be included, though for real-time feedback processing it is understood that limiting the responses requested from the first responders may allow the first responders to better deal with the emergency response situation. For re-computation of device clusters, the first responder feedback would include at least the device's actual current floor.

At decision point 628, the process 600 makes a determination as to whether the approximate floor provided to the emergency responder(s) was different from the device's actual current floor during the emergency. It should be noted that the first responder feedback may include a confirmation that the device's determined approximate current floor is the device's actual current floor. Alternatively, the device's actual current floor may be different from the device's determined approximate current floor that was provided to the first responder(s).

In response to determining at decision point 628 that the device's actual current floor during the emergency was not different from the approximate floor provided to the emergency responder(s), the process 600 re-computes the device cluster by increasing a confidence measure of the device cluster mapped to the device's current location at block 630. As such, the process 600 re-computes the device clusters based upon the feedback and increases the confidence measure of the closest cluster centroid associated with the geographic location of the device to which the device is mapped that resulted in accurate floor mappings during emergencies over time. The process 600 returns to decision point 602 and iterates as described above.

Alternatively, in response to determining at decision point 628 that the device's actual current floor during the emergency was different from the approximate floor provided to the emergency responder(s), the process 600 re-computes the device clusters based upon the first responder feedback. This re-computation of the device clusters at the particular geographic location of the device where the emergency occurred may include re-clustering the known geospatial device coordinates of the geographic location of the device where the emergency occurred into elevation regions based upon a determined inter-floor height. The inter-floor height may be determined by use of the device's actual current floor received from the first responder(s). As such, the first responder feedback of the actual current floor may be used to re-map individual geographic locations over time into more accurate inter-floor cluster mappings. The process 600 returns to decision point 602 and iterates as described above, where the process 600 can determine current floor(s) of additional devices based upon the re-computed device clusters.

As such, the process 600 performs device clustering analysis to form cluster centroids for particular geographic locations, including both horizontal and vertical floor dimensions. The process 600 annotates the cluster centroids with regional floor-height values. During real-time emergency response situations, the process 600 receives current device positioning data of one or more devices, and determines the location and approximate floor of the emergency. The process 600 directs emergency response personnel to the location and approximate floor of the emergency, and processes emergency response personnel feedback to continually improve the accuracy of the device cluster and floor mappings. Accordingly, the process 600 and the subject matter described herein allow emergency response personnel to engage in rescue efforts with confidence that their own safety is improved by focusing their rescue efforts on the actual (verified) locations of persons with mobile devices, and the safety of persons in need of rescue is improved by reducing the time required for the emergency response personnel to reach the persons in need of rescue.

Some embodiments of the present invention may improve the technology of computers in one, or more, of the following ways by: (i) improving real-time emergency response effectiveness; (ii) improving real-time emergency response personnel safety; and (iii) reducing time required to save people in large building structures during emergency response situations.

The present invention is not abstract because it relates particularly to computer operations and/or hardware for reasons that may include the following: (i) the computer-based machine-learning is applied to a specific problem of emergency response situations and by use of emergency responder feedback to re-compute floor determinations; (ii) the computer-based machine-learning saves lives of both persons in need of rescue in large buildings and of emergency response personnel that risk their lives to save persons in need of rescue; and (iii) the real-time computer processing is deployed within a complex computing environment that is enhanced with technological processing that could not be performed by prior conventional technologies.

As described above in association with FIG. 1 through FIG. 6, the example systems and processes provide first responder feedback-based emergency response floor identification. Many other variations and additional activities associated with first responder feedback-based emergency response floor identification are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    clustering known geospatial device coordinates using a machine learning-based clustering algorithm, resulting in device clusters with corresponding cluster centroids, each device cluster corresponding to a particular geographical location;
    annotating each cluster centroid with a regional floor-height value of the respective particular geographical location;
    receiving current device data comprising latitude, longitude, and elevation of a first device;

determining a geographic location of the first device using the received latitude and longitude of the first device; and determining an approximate current floor upon which the first device is located by:

mapping the current device data of the first device to a closest cluster centroid associated with the geographic location of the first device; and calculating the approximate current floor upon which the first device is located using the received elevation of the first device and the annotated regional floor-height value of the closest cluster centroid;

the computer-implemented method further comprising:

directing an individual to the geographic location and the approximate current floor of the first device;

re-computing the device clusters based upon feedback received from the individual regarding an actual current floor of the first device; and determining a current floor for a second device based upon the re-computed device clusters.

2. The computer-implemented method of claim 1, where:

the feedback comprises the actual current floor of the first device;

the actual current floor of the first device is different from the determined approximate current floor of the first device;

the actual current floor of the first device is used to determine an inter-floor height of the geographic location of the first device; and re-computing the device clusters based upon the feedback comprises re-clustering the known geospatial device coordinates of the geographic location of the first device into elevation regions based upon the determined inter-floor height.

3. The computer-implemented method of claim 1, where:

the feedback comprises a confirmation that the determined approximate current floor upon which the first device is located is the actual current floor upon which the first device is located; and re-computing the device clusters based upon the feedback comprises increasing a confidence measure of the closest cluster centroid associated with the geographic location of the first device to which the first device is mapped.

4. The computer-implemented method of claim 1, where:

the known geospatial device coordinates comprise latitude coordinates, longitude coordinates, and elevation coordinates of a plurality of devices; and the regional floor-height value annotated to each cluster centroid comprises one of a publicly known regional floor-height value or an approximate regional floor-height value of the respective particular geographical location.

5. The computer-implemented method of claim 1, where the machine learning-based clustering algorithm comprises one of vector quantization-based k-means clustering or density-based spatial clustering of applications with noise (DBSCAN).

6. The computer-implemented method of claim 1, where the individual comprises an emergency first responder, and where determining the approximate current floor upon which the first device is located comprises determining the approximate current floor upon which the first device is located during an emergency response situation.

7. The computer-implemented method of claim 1, where software programmed according to the computer-implemented method is provided as a service in a cloud environment.

8. A system, comprising:

a memory; and a processor programmed to:

cluster, within the memory, known geospatial device coordinates using a machine learning-based clustering algorithm, resulting in device clusters with corresponding cluster centroids, each device cluster corresponding to a particular geographical location;

annotate each cluster centroid with a regional floor-height value of the respective particular geographical location;

receive current device data comprising latitude, longitude, and elevation of a first device;

determine a geographic location of the first device using the received latitude and longitude of the first device; and determine an approximate current floor upon which the first device is located by:

mapping the current device data of the first device to a closest cluster centroid associated with the geographic location of the first device; and calculating the approximate current floor upon which the first device is located using the received elevation of the first device and the annotated regional floor-height value of the closest cluster centroid; and the processor being further programmed to:

direct an individual to the geographic location and the approximate current floor of the first device;

re-compute the device clusters based upon feedback received from the individual regarding an actual current floor of the first device; and determine a current floor for a second device based upon the re-computed device clusters.

9. The system of claim 8, where:

the feedback comprises the actual current floor of the first device;

the actual current floor of the first device is different from the determined approximate current floor of the first device;

the actual current floor of the first device is used to determine an inter-floor height of the geographic location of the first device; and in being programmed to re-compute the device clusters based upon the feedback, the processor is programmed to re-cluster the known geospatial device coordinates of the geographic location of the first device into elevation regions based upon the determined inter-floor height.

10. The system of claim 8, where:

the feedback comprises a confirmation that the determined approximate current floor upon which the first device is located is the actual current floor upon which the first device is located; and in being programmed to re-compute the device clusters based upon the feedback, the processor is programmed to increase a confidence measure of the closest cluster centroid associated with the geographic location of the first device to which the first device is mapped.

11. The system of claim 8, where:

the known geospatial device coordinates comprise latitude coordinates, longitude coordinates, and elevation coordinates of a plurality of devices; and the regional floor-height value annotated to each cluster centroid comprises one of a publicly known regional floor-height value or an approximate regional floor-height value of the respective particular geographical location.

12. The system of claim 8, where the machine learning-based clustering algorithm comprises one of vector quantization-based k-means clustering or density-based spatial clustering of applications with noise (DBSCAN).

13. The system of claim 8, where the individual comprises an emergency first responder, and where in being programmed to determine the approximate current floor upon which the first device is located, the processor is programmed to determine the approximate current floor upon which the first device is located during an emergency response situation.

14. A computer program product, comprising:
a computer readable storage medium having computer readable program code embodied therewith, where the computer readable storage medium is not a transitory signal per se and where the computer readable program code when executed on a computer causes the computer to:
cluster known geospatial device coordinates using a machine learning-based clustering algorithm, resulting in device clusters with corresponding cluster centroids, each device cluster corresponding to a particular geographical location;
annotate each cluster centroid with a regional floor-height value of the respective particular geographical location;
receive current device data comprising latitude, longitude, and elevation of a first device;
determine a geographic location of the first device using the received latitude and longitude of the first device; and
determine an approximate current floor upon which the first device is located by:
mapping the current device data of the first device to a closest cluster centroid associated with the geographic location of the first device; and
calculating the approximate current floor upon which the first device is located using the received elevation of the first device and the annotated regional floor-height value of the closest cluster centroid; and
the computer readable program code when executed on the computer further causes the computer to:
direct an individual to the geographic location and the approximate current floor of the first device;
re-compute the device clusters based upon feedback received from the individual regarding an actual current floor of the first device; and
determine a current floor for a second device based upon the re-computed device clusters.

15. The computer program product of claim 14, where:
the feedback comprises the actual current floor of the first device;
the actual current floor of the first device is different from the determined approximate current floor of the first device;
the actual current floor of the first device is used to determine an inter-floor height of the geographic location of the first device; and
in causing the computer to re-compute the device clusters based upon the feedback, the computer readable program code when executed on the computer causes the computer to re-cluster the known geospatial device coordinates of the geographic location of the first device into elevation regions based upon the determined inter-floor height.

16. The computer program product of claim 14, where:
the feedback comprises a confirmation that the determined approximate current floor upon which the first device is located is the actual current floor upon which the first device is located; and
in causing the computer to re-compute the device clusters based upon the feedback, the computer readable program code when executed on the computer causes the computer to increase a confidence measure of the closest cluster centroid associated with the geographic location of the first device to which the first device is mapped.

17. The computer program product of claim 14, where:
the known geospatial device coordinates comprise latitude coordinates, longitude coordinates, and elevation coordinates of a plurality of devices; and
the regional floor-height value annotated to each cluster centroid comprises one of a publicly known regional floor-height value or an approximate regional floor-height value of the respective particular geographical location.

18. The computer program product of claim 14, where the machine learning-based clustering algorithm comprises one of vector quantization-based k-means clustering or density-based spatial clustering of applications with noise (DBSCAN).

19. The computer program product of claim 14, where the individual comprises an emergency first responder, and where in causing the computer to determine the approximate current floor upon which the first device is located, the computer readable program code when executed on the computer causes the computer to determine the approximate current floor upon which the first device is located during an emergency response situation.

20. The computer program product of claim 14, where software programmed according to the computer is provided as a service in a cloud environment.

* * * * *